US010120661B2

(12) United States Patent
Sandberg et al.

(10) Patent No.: US 10,120,661 B2
(45) Date of Patent: Nov. 6, 2018

(54) MULTI-FLAVORED SOFTWARE EXECUTION FROM A SINGULAR CODE BASE

(71) Applicant: SugarCRM Inc., Cupertino, CA (US)

(72) Inventors: Andreas Sandberg, Pacifica, CA (US); Yuk Lai Suen, Menlo Park, CA (US)

(73) Assignee: SUGARCRM INC., Cupertino, CA (US)

( * ) Notice: Subject to any disclaimer, the term of this patent is extended or adjusted under 35 U.S.C. 154(b) by 168 days.

(21) Appl. No.: 14/800,918

(22) Filed: Jul. 16, 2015

(65) Prior Publication Data

US 2017/0017471 A1  Jan. 19, 2017

(51) Int. Cl.
*G06F 9/44* (2018.01)
*G06F 9/445* (2018.01)
(Continued)

(52) U.S. Cl.
CPC .................. *G06F 8/41* (2013.01); *G06F 8/42* (2013.01); *G06F 8/71* (2013.01); *G06F 8/52* (2013.01);
(Continued)

(58) Field of Classification Search
CPC ........ G06F 21/552; G06F 9/00; G06F 9/4448; G06F 9/442; G06F 9/4443; G06F 9/44526; G06F 9/44521; G06F 9/45516; G06F 17/30905; G06F 17/50; G06F 17/30893; G06F 8/30; G06F 8/71; G06F 8/66; G06F 8/65; G06F 8/68; G06F 8/75; G06F 8/427; G06F 8/52; G06F 8/36; G06F 8/447; G06F 8/73; G06F 8/41; G06F 8/47; G06F 8/38;
(Continued)

(56) References Cited

U.S. PATENT DOCUMENTS 4,912,637 A * 3/1990 Sheedy ..................... G06F 8/71
5,774,728 A * 6/1998 Breslau ..................... G06F 8/47
717/141
(Continued)

OTHER PUBLICATIONS

Joseph Hummel et al., Annotating the Java Bytecodes in Support of Optimization, Apr. 1997, [Retrieved on Jun. 22, 2018]. Retrieved from the internet: <URL: https://pdfs.semanticscholar.org/28bf/b605510deaebc2c7777532d5081975edd590.pdf> 16 Pages (1-16) (Year: 1997).*

(Continued)

*Primary Examiner* — Anibal Rivera
(74) *Attorney, Agent, or Firm* — Steven M. Greenberg, Esq.; Shutts & Bowen LLP

(57) ABSTRACT

Embodiments of the present invention provide a method, system and computer program product for multi-flavored software execution from a singular code base. In an embodiment of the invention, a method for multi-flavored software execution from a singular code base is provided. The method includes receiving a request in an interpreter to interpret a version of source code of a computer program the interpreting transforming the source code into byte code executable by a virtual machine. The method thereafter includes responding to the request by performing in the interpreter source code interpretation only of selected portions of the source code being annotated by tags corresponding to the version.

10 Claims, 2 Drawing Sheets

(51) Int. Cl.
*G06F 17/30* (2006.01)
*G06F 9/46* (2006.01)
*G06F 8/41* (2018.01)
*G06F 8/71* (2018.01)
*G06F 8/52* (2018.01)
*G06F 8/65* (2018.01)
*G06F 11/36* (2006.01)
*G06F 9/451* (2018.01)

(52) U.S. Cl.
CPC ............... *G06F 8/65* (2013.01); *G06F 9/454* (2018.02); *G06F 11/3636* (2013.01); *G06F 11/3676* (2013.01); *G06F 17/30905* (2013.01)

(58) Field of Classification Search
CPC .......... G06F 8/70; G06F 9/4428; G06F 9/465; G06F 9/445; G06F 11/36; G06F 11/3612; G06F 8/443; G06F 8/42; G06F 8/76; G06F 17/2288; G06F 9/451; G06F 9/454; G06F 9/4488; G06F 9/449; G06F 9/4492; G06F 9/45508; G06F 11/3676; G06F 11/3636
See application file for complete search history.

(56) References Cited

U.S. PATENT DOCUMENTS

| | | | |
|---|---|---|---|
| 5,850,550 A * | 12/1998 | Li | G06F 8/427 717/154 |
| 6,205,578 B1 * | 3/2001 | Grove | G06F 9/45508 717/118 |
| 6,405,223 B1 * | 6/2002 | Kelley | G06F 17/30893 707/999.202 |
| 6,463,578 B1 * | 10/2002 | Johnson | G06F 9/4488 717/124 |
| 6,934,842 B2 * | 8/2005 | Okamoto | G06K 17/00 713/168 |
| 7,100,118 B1 * | 8/2006 | Klask | G06F 9/451 715/764 |
| 7,155,705 B1 * | 12/2006 | Hershberg | G06F 8/73 717/137 |
| 7,222,333 B1 * | 5/2007 | Mor | G06F 8/41 709/201 |
| 7,305,666 B2 * | 12/2007 | Burger | G06F 9/4488 717/140 |
| 7,707,563 B2 * | 4/2010 | Wei | G06F 8/41 717/140 |
| 7,904,807 B2 * | 3/2011 | Bell | G06F 17/30893 715/204 |
| 7,941,798 B2 * | 5/2011 | Taylor | G06F 8/71 717/170 |
| 8,381,194 B2 * | 2/2013 | Wang | G06F 11/3676 714/38.1 |
| 8,418,161 B2 * | 4/2013 | Bauchot | G06F 9/44552 717/165 |
| 8,806,432 B2 * | 8/2014 | Tatsubori | G06F 8/30 717/115 |
| 9,032,390 B2 * | 5/2015 | Tsuk | G06F 9/44526 717/170 |
| 9,344,524 B2 * | 5/2016 | Arnault | H04L 67/32 |
| 2002/0078071 A1 * | 6/2002 | Foster | G06F 8/71 |
| 2003/0145282 A1 * | 7/2003 | Thomas | G06F 8/71 715/230 |
| 2004/0143823 A1 * | 7/2004 | Wei | G06F 8/41 717/140 |
| 2004/0172462 A1 * | 9/2004 | Iterum | G06F 9/465 709/223 |
| 2004/0230967 A1 * | 11/2004 | Yuknewicz | G06F 8/71 717/170 |
| 2004/0243989 A1 * | 12/2004 | Owens | G06F 8/443 717/151 |
| 2005/0229156 A1 * | 10/2005 | Baumann | G06F 8/73 717/110 |
| 2006/0253508 A1 * | 11/2006 | Colton | G06F 8/52 |
| 2006/0271920 A1 * | 11/2006 | Abouelsaadat | G06F 9/454 717/137 |
| 2007/0143747 A1 * | 6/2007 | Taylor | G06F 8/71 717/168 |
| 2008/0127070 A1 * | 5/2008 | Barcia | G06F 9/4492 717/116 |
| 2009/0049288 A1 * | 2/2009 | Weissman | G06F 8/71 712/245 |
| 2009/0055809 A1 * | 2/2009 | Campbell | G06F 8/36 717/140 |
| 2009/0113397 A1 * | 4/2009 | Wright, Sr. | G06F 21/552 717/127 |
| 2009/0210855 A1 * | 8/2009 | Ramanathan | G06F 8/36 717/102 |
| 2010/0070516 A1 * | 3/2010 | Adler | G06F 8/71 707/758 |
| 2010/0115502 A1 * | 5/2010 | Jiva | G06F 9/45516 717/148 |
| 2010/0138820 A1 * | 6/2010 | Joshi | G06F 11/3612 717/158 |
| 2010/0146491 A1 * | 6/2010 | Hirano | G06F 9/454 717/137 |
| 2011/0047531 A1 * | 2/2011 | Wang | G06F 11/3676 717/130 |
| 2011/0047532 A1 * | 2/2011 | Wang | G06F 11/3676 717/130 |
| 2011/0067013 A1 * | 3/2011 | Frost | G06F 8/30 717/148 |
| 2011/0145803 A1 * | 6/2011 | Soderstedt | G06F 8/66 717/154 |
| 2011/0191754 A1 * | 8/2011 | Burugula | G06F 9/00 717/139 |
| 2011/0302557 A1 * | 12/2011 | Tatsubori | G06F 8/30 717/115 |
| 2011/0314460 A1 * | 12/2011 | Wischik | G06F 8/41 717/151 |
| 2012/0054725 A1 * | 3/2012 | Inglis | G06F 8/4443 717/148 |
| 2012/0096447 A1 * | 4/2012 | Inglis | G06F 8/4443 717/148 |
| 2012/0110559 A1 * | 5/2012 | Dolinsky | G06F 8/45 717/143 |
| 2012/0226646 A1 * | 9/2012 | Donoho | G06Q 10/101 706/46 |
| 2013/0097584 A1 * | 4/2013 | Ayash | G06F 8/76 717/121 |
| 2013/0174124 A1 * | 7/2013 | Watters | G06F 8/71 717/122 |
| 2013/0174133 A1 * | 7/2013 | Goetz | G06F 8/47 717/140 |
| 2013/0185697 A1 * | 7/2013 | Farchi | G06F 8/71 717/113 |
| 2013/0339928 A1 * | 12/2013 | Trofin | G06F 9/44521 717/122 |
| 2014/0068559 A1 * | 3/2014 | Szocs | G06F 8/38 717/120 |
| 2014/0157291 A1 * | 6/2014 | Adams | G06F 9/44521 719/331 |
| 2014/0208199 A1 * | 7/2014 | Peleg | G06Q 30/0277 715/234 |
| 2014/0344403 A1 * | 11/2014 | Arnault | H04L 67/32 709/217 |
| 2015/0100955 A1 * | 4/2015 | Chen | G06F 8/65 717/170 |
| 2015/0121340 A1 * | 4/2015 | Grant | G06F 8/71 717/121 |
| 2015/0128121 A1 * | 5/2015 | Garcia | G06F 8/65 717/170 |
| 2015/0169294 A1 * | 6/2015 | Brock | G06F 8/42 717/164 |
| 2015/0301840 A1 * | 10/2015 | Goetz | G06F 9/4488 717/166 |
| 2016/0048441 A1 * | 2/2016 | Husar | G06F 11/3636 717/128 |

(56) References Cited

U.S. PATENT DOCUMENTS

| | | | | |
|---|---|---|---|---|
| 2016/0070551 A1* | 3/2016 | Miller | ............... | G06F 17/30905 |
| | | | | 717/148 |
| 2016/0110313 A1* | 4/2016 | Prakash | .............. | G06F 17/2288 |
| | | | | 715/202 |
| 2016/0202961 A1* | 7/2016 | Goetz | .................... | G06F 9/449 |
| | | | | 717/148 |

OTHER PUBLICATIONS

Joel Jones et al., Annotating Java class files with virtual registers for performance, 2000, [Retrieved on Jun. 22, 2018]. Retrieved from the internet: <URL: http://loomecsweb.web.engr.illinois.edu/pubs/jones-kamin.pdf> 18 Pages (390-406) (Year: 2000).*

* cited by examiner

MULTI-FLAVORED SOFTWARE EXECUTION FROM A SINGULAR CODE BASE

BACKGROUND OF THE INVENTION

Field of the Invention

The present invention relates to software versioning and more particularly to deploying different versions of a computer program to different end users.

Description of the Related Art

Traditional software deployment refers to the development and distribution of a computer program that provides one or more functional features upon execution in the memory of a computer. As different functional features are developed, new versions of same computer program are deployed, either as an upgrade for an existing end user or a new purchase for a new or existing end user. At any given moment, the developer distributes only a single, most recent version of the computer program, though prior versions of the computer program remain deployed for existing end users.

Oftentimes, it is desirable to deploy multiple different versions of the same computer program at the same time, each of the versions incorporating a different selection of functional features. In many instances, a basic and advanced version of the same computer program is provided, the cost of both versions varying according to the number and nature of the selection of the functional features. To deploy multiple versions of the same computer program, however, requires multiple different builds of the same computer based upon a single code base.

To address the complexity and inefficiency of deploying multiple different versions of the same computer program, developers build a single deployable computer program with certain functions disabled. Responsive to internal programmatic directives, different ones of the functional features can be enabled or disabled so as to customize the set of functional features. Thus, essentially different versions of the computer program may exist with but a single deployed computer program. Consequently, the size of the executable computer program can be massive in that all possible functional features must be present in the executable object at run-time irrespective of the number of features ultimately selected for use by the end user.

BRIEF SUMMARY OF THE INVENTION

Embodiments of the present invention address deficiencies of the art in respect to application versioning and provide a novel and non-obvious method, system and computer program product for multi-flavored software execution from a singular code base. In an embodiment of the invention, a method for multi-flavored software execution from a singular code base is provided. The method includes receiving a request in an interpreter to interpret a version of source code of a computer program the interpreting transforming the source code into byte code executable by a virtual machine. The method thereafter includes responding to the request by performing in the interpreter source code interpretation only of selected portions of the source code being annotated by tags corresponding to the version. In one aspect of the embodiment, the interpreter is a PHP hypertext processor interpreter. In another aspect of the embodiment, the source code includes multiple portions, each portion having an annotation indicating a particular corresponding version of the computer program.

In another embodiment of the invention, a data processing system is configured for multi-flavored software execution from a singular code base. The system includes a host computing system having at least one computer with memory and at least one processor. The system also includes a virtual machine executing in the memory of the host computing system and an interpreter executing in the virtual machine. The interpreter includes program code enabled to receive a request to interpret a version of source code of a computer program the interpreting transforming the source code into byte code executable by the virtual machine, and to respond to the request by performing in the interpreter source code interpretation only of selected portions of the source code being annotated by tags corresponding to the version.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for multi-flavored software execution from a singular code base. In accordance with an embodiment of the invention, an instruction is received in an interpreter to interpret source code of a computer program into object code suitable for execution by an underlying operating system. The source code includes programmatic instructions grouped by functionality with selected ones of the grouped functionality being annotated with a tag corresponding to a particular version of the computer program. In response, the interpreter parses the source code and interprets only those portions of the source code with an annotation matching a specified version. In this way, a single code base of the computer program is maintained while still allowing for multiple versioning without requiring building a large executable for the specified version.

Figure 1:
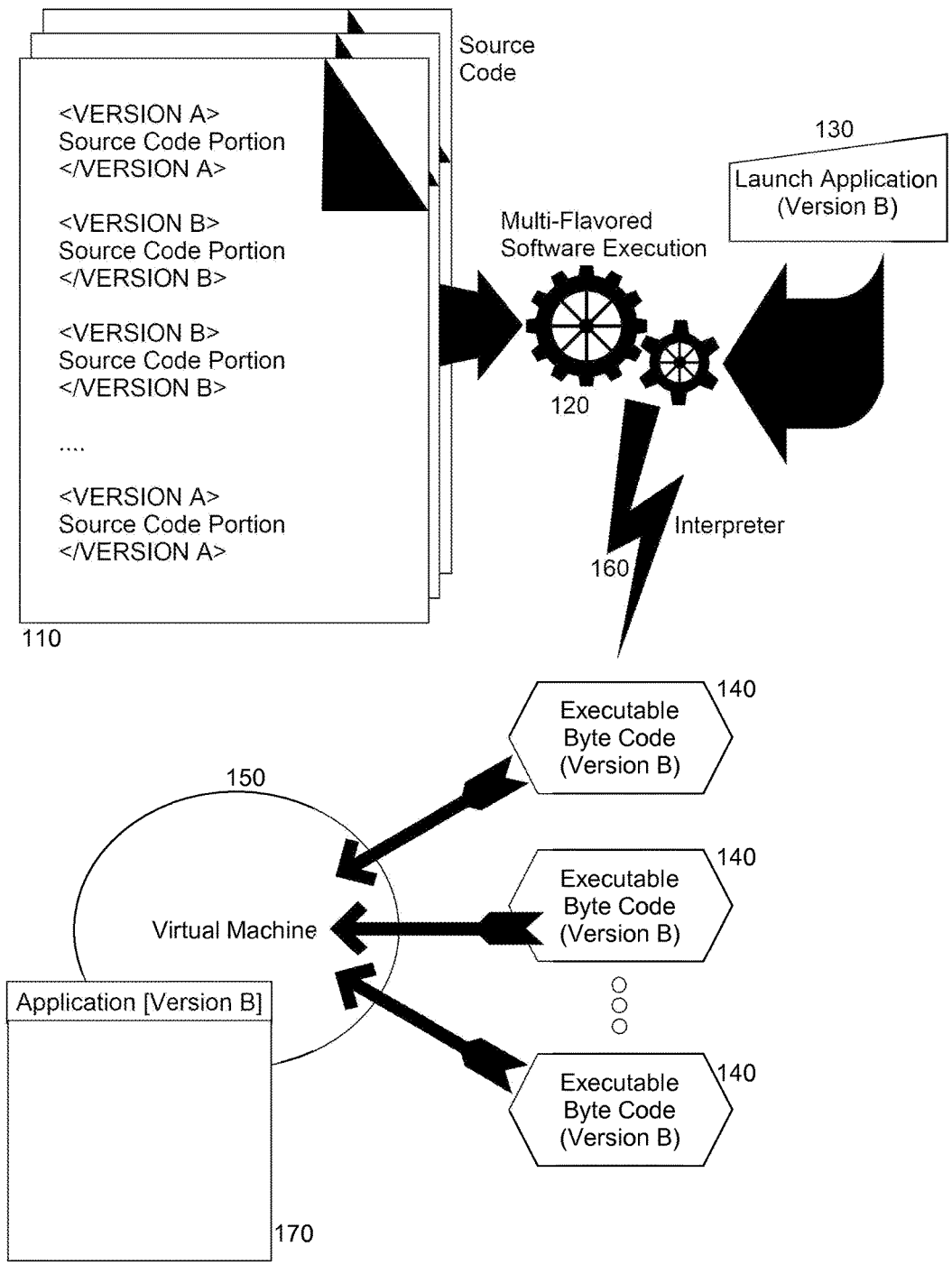
FIG. 1 is a pictorial illustration of a process for multi-flavored software execution from a singular code base.

In further illustration, FIG. 1 pictorially shows a process for multi-flavored software execution from a singular code base. As shown in FIG. 1, one or more source code files 110 of interpretable source code for a multi-version application are provided. Each of the source code files 110 includes different portions, annotated according to a specified version. Multi-flavored software execution logic 120 receives from an end user a provisioning request 130 to execute a particular version of the multi-version application. The provisioning request 130 particularly specifies a version of the multi-version application.

Thereafter, the multi-flavored software execution logic 120 parses the source code files 110. In doing so, the multi-flavored software execution logic 120 permits the interpreter 160 to interpret only those portions of the source code files 110 that have been annotated with a version consistent with the version specified in the provisioning request 130. Thereafter, the interpreter produces byte code objects 140 corresponding to the interpreted portions of the source code files 110. The resultant byte code objects 140 are then provided to a virtual machine 150 in which the objects 140 are executed in order to present the requested version of the application 170 without building the requested version.

Figure 2:
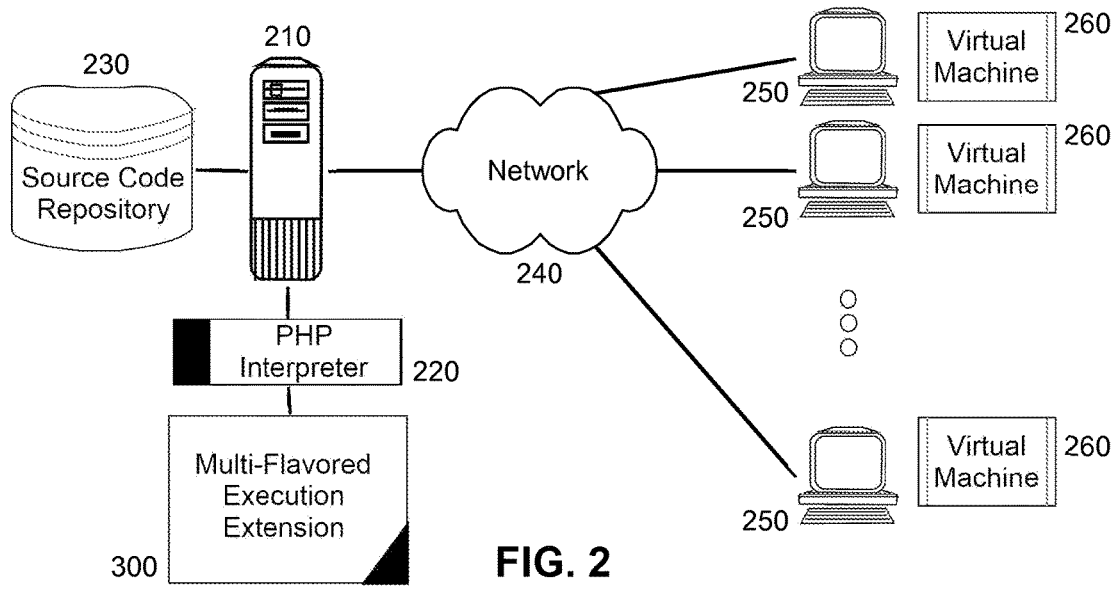
FIG. 2 is a schematic illustration of a data processing system configured for multi-flavored software execution from a singular code base; and, FIG. 3 is a flow chart illustrating a process for multi-flavored software execution from a singular code base.

The process described in connection with FIG. 1 is implemented in a data processing system. In yet further illustration, FIG. 2 schematically illustrates a data processing system configured for multi-flavored software execution from a singular code base. The system includes a host computing system 210 that includes one or more computers, each with memory and at least one processor. The host computing system 210 is coupled to a source code repository 230 of source code files for a multi-version application. A PHP interpreter 220 executes in the memory of the host computing system 210 utilizing the computing resources both physical and logical of the host computing system 210, and is configured to interpret different specified portions of source code files in the source code repository 230 and to provide resulting byte code over computer communications network 240 to requesting virtual machines 260 executing in respectively different client computers 250.

Of note, the system includes a multi-flavored execution extension 300 to the PHP interpreter 220. The multi-flavored execution extension 300 is included either as part of the program code of the PHP interpreter 220 thereby forming a customized interpreter, or the multi-flavored execution extension 300 is coupled to the PHP interpreter 220 as an extension to the PHP interpreter 220. In either circumstance, the multi-flavored execution extension 300 includes program code that when executed within the memory of the host computing system 210, is enabled to identify a particular version of the multi-version application, to load the source code files in the repository 230 for the application, to select only those portions of the source code files pertinent to the identified version, and to provide those selected portions to the PHP interpreter 220 for interpretation into resultant byte code to be transmitted to a requesting one of the virtual machines 260.

Figure 3:
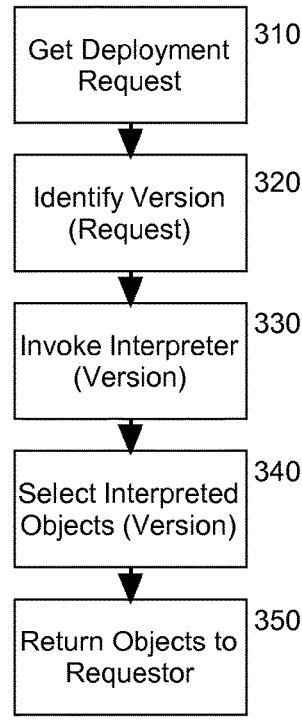

In even yet further illustration of the operation of the multi-flavored execution extension 300, FIG. 3 is a flow chart illustrating a process for multi-flavored software execution from a singular code base. Beginning in block 310, a deployment request is received to provision a version of a multi-version application into a virtual machine of a communicatively coupled client computer. In block 320, the requested version is identified and in block 330, an interpreter is invoked to interpret only those portions of the source code of the multi-version application relating to the specified version in order to produce byte code specified for the specified version of the multi-version application. In block 340, the resultant byte code is selected and provided to the virtual machine in block 350.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method for multi-flavored software execution from a singular code base, the method comprising:
   receiving a request in an interpreter to interpret a version of source code of a computer program that is interpretable in accordance with an interpretable programming language without building the version, the interpreting transforming the source code in the interpretable programming language into byte code executable by a virtual machine;
   responding to the request by performing in the interpreter source code interpretation only of selected portions of the source code in the interpretable programming language that are annotated by tags corresponding to the version without building the version so as to produce byte code only for those portions of the source code in the interpretable programming language that are annotated by the tags corresponding to the version without building the version, while other portions of the source code in the interpretable programming language that are annotated by different tags corresponding to different versions of the source code are excluded from interpretation into byte code; and,
   passing the byte code produced during interpretation to the virtual machine for execution.

2. The method of claim 1, wherein the interpreter is a PHP hypertext processor interpreter.

3. The method of claim 1, wherein the source code comprises multiple portions, each portion comprising an annotation indicating a particular corresponding version of the computer program.

4. A data processing system configured for multi-flavored software execution from a singular code base, the system comprising:
   a host computing system comprising at least one computer with memory and at least one processor;
   a virtual machine executing in the memory of the host computing system;
   an interpreter executing in the virtual machine, the interpreter comprising program code enabled to receive a request to interpret a version of source code of a computer program that is interpretable in accordance with an interpretable programming language without building the version, the interpreting transforming the source code in the interpretable programming language into byte code executable by the virtual machine, to respond to the request by performing in the interpreter source code interpretation only of selected portions of the source code in the interpretable programming language that are annotated by tags corresponding to the version without building the version so as to produce byte code only for those portions of the source code in the interpretable programming language that are annotated by the tags corresponding to the version without building the version, while other portions of the source code in the interpretable programming language that are annotated by different tags corresponding to different versions of the source code care excluded from interpretation into byte code, and to pass the byte code produced during interpretation to the virtual machine for execution.

5. The system of claim 4, wherein the interpreter is a PHP hypertext processor interpreter.

6. The system of claim 4, wherein the source code comprises multiple portions, each portion comprising an annotation indicating a particular corresponding version of the computer program.

7. The system of claim 4, wherein the program code is included as an extension to the interpreter.

8. A computer program product for multi-flavored software execution from a singular code base, the computer program product comprising a computer readable storage medium having program instructions embodied therewith, the program instructions executable by a device to cause the device to perform a method comprising:

receiving a request in an interpreter to interpret a version of source code of a computer program that is interpretable in accordance with an interpretable programming language without building the version, the interpreting transforming the source code in the interpretable programming language into byte code executable by a virtual machine;

responding to the request by performing in the interpreter source code interpretation only of selected portions of the source code in the interpretable programming language that are annotated by tags corresponding to the version without building the version so as to produce byte code only for those portions of the source code in the interpretable programming language that are annotated by the tags corresponding to the version without building the version, while other portions of the source code in the interpretable programming language that are annotated by different tags corresponding to different versions of the source code are excluded from interpretation into byte code; and, passing the byte code produced during interpretation to the virtual machine for execution.

9. The computer program product of claim 8, wherein the interpreter is a PHP hypertext processor interpreter.

10. The computer program product of claim 8, wherein the source code comprises multiple portions, each portion comprising an annotation indicating a particular corresponding version of the computer program.

* * * * *